United States Patent
Oya et al.

(10) Patent No.: US 7,031,058 B2
(45) Date of Patent: Apr. 18, 2006

(54) IMAGE DISPLAY SCREEN AND IMAGE DISPLAY DEVICE

(75) Inventors: Taro Oya, Sagamihara (JP); Tadashi Shingu, Tokyo (JP)

(73) Assignee: Teijin Limited, Osaka (JP)

(*) Notice: Subject to any disclaimer, the term of this patent is extended or adjusted under 35 U.S.C. 154(b) by 161 days.

(21) Appl. No.: 10/344,522

(22) PCT Filed: Jun. 17, 2002

(86) PCT No.: PCT/JP02/06002

§ 371 (c)(1),
(2), (4) Date: Feb. 12, 2003

(87) PCT Pub. No.: WO02/103453

PCT Pub. Date: Dec. 27, 2002

(65) Prior Publication Data

US 2004/0004760 A1 Jan. 8, 2004

(51) Int. Cl.
*G03B 21/56* (2006.01)
*G03B 21/60* (2006.01)

(52) U.S. Cl. .................. 359/443; 359/452; 359/589
(58) Field of Classification Search .......... 349/5, 349/105, 137; 359/443, 449, 452, 580, 582, 359/584, 586, 588, 589
See application file for complete search history.

(56) References Cited

FOREIGN PATENT DOCUMENTS

| EP | 1 164 008 A | * 12/2001 |
|----|-------------|-----------|
| JP | 11-015079 | 1/1999 |
| JP | 2000-122181 A | 4/2000 |
| JP | 2000-326467 | 11/2000 |

* cited by examiner

*Primary Examiner*—Toan Ton
*Assistant Examiner*—Tai Duong
(74) *Attorney, Agent, or Firm*—Sughrue Mion, PLLC

(57) ABSTRACT

An image display screen which is composed of a multi-layer film consisting of at least 11 layers and formed by alternately laminating first thermoplastic resin layers having a thickness of 0.05 to 0.03 μm with second thermoplastic resin layers having a thickness of 0.05 to 0.3 μm and a parallel ray transmittance of 50% or more, and which has at least a reflection peak with a maximum reflectance 5 to 80% higher than the base line of reflectance and a half-value width of 20 to 200 nm in its reflectance curve for visible light having a wavelength of 380 to 780 nm, and an image display device comprising the same as a screen. This screen has improved transparency while maintaining the definition of an image.

10 Claims, 3 Drawing Sheets

IMAGE DISPLAY SCREEN AND IMAGE DISPLAY DEVICE

FIELD OF THE INVENTION

The present invention relates to an image display screen and an image display device. More specifically, it relates to a transparent image display screen which projects an image onto both the incident side and transmission side of visible light by reflecting at least part of the visible light from a projector and to an image display device comprising the same.

DESCRIPTION OF THE PRIOR ART

A large-sized image is generally projected by a projector typified by a liquid crystal projector. A transparent substrate such as a glass substrate has been used as an image display screen to provide a design to an image projected by this projector. A design which is not seen in the prior art is obtained from the image projected onto the transparent substrate because the opposite side of the image display screen is seen.

As a general method of displaying an image on the above transparent substrate, the surface of the transparent substrate is made of uneven for the diffused reflection of light, or a semi-transparent so-called hologram screen as shown in JP-A 2000-122181 (the term "JP-A" as used herein means an "unexamined published Japanese patent application") is used. However, in the former method, the transparency of an image display screen must be reduced to project an image clearly. Thus, the definition and design of the image to be displayed are contradictory to each other. In the latter method, an extremely special polymer must be used but the obtained design is the same as that of the former method though transparency can be increased while the definition of the image is maintained. Although the latter method can display an image on the transmission side more clearly than the former method, it cannot display an image on the opposite side clearly.

SUMMARY OF THE INVENTION

It is an object of present invention to provide an image display screen which has overcome the above problems and has improved transparency while maintaining the definition of an image.

It is another object of the present invention to provide an image display screen which has improved transparency while maintaining the definition of an image by making use of light interference between layers as a screen for reflecting light from a projector unlike the prior art method making use of diffused light.

It is still another object of the present invention to provide a film for the above image display screen of the present invention.

It is a further object of the present invention to provide an image display device comprising the above image display screen of the present invention.

Other objects and advantages of the present invention will become apparent from the following description.

According to the present invention, firstly, the above objects and advantages of the present invention are attained by an image display screen which comprises (1) a multi-layer film consisting of at least 11 layers and formed by alternately laminating first thermoplastic resin layers having a thickness of 0.05 to 0.3 μm with second thermoplastic resin layers having a thickness of 0.05 to 0.3 μm and which has (2) a reflection peak with a maximum reflectance 5 to 80% higher than the base line of reflectance and a half-value width of 20 to 200 nm in its reflectance curve for visible light having a wavelength of 380 to 780 nm and (3) a parallel ray transmittance of 50% or more.

According to the present invention, secondly, the above objects and advantages of the present invention are attained by a multi-layer film which (1) comprises at least 11 layers and is formed by alternately laminating first thermoplastic resin layers having a thickness of 0.05 to 0.3 μm and second thermoplastic resin layers having a thickness of 0.05 to 0.3 μm, and which has (2) a reflection peak with a maximum reflectance 5 to 80% higher than the base line of reflectance and a half-value width of 20 to 200 nm in its reflectance curve for visible light having a wavelength of 380 to 780 nm, and (3) a parallel ray transmittance of 50% or more, and (4) is for an image display screen.

According to the present invention, thirdly, the above objects and advantages of the present invention are attained by an image display device which comprises the image display screen of the present invention and a projector for projecting visible light having a wavelength of 380 to 780 nm.

DETAILED DESCRIPTION OF THE EMBODIMENT

The image display screen of the present invention is composed of a multi-layer film formed by alternately laminating first thermoplastic resin layers (to be referred to as "first layers" hereinafter) with second thermoplastic resin layers (to be referred to as "second layers" hereinafter) which differ in composition from the thermoplastic resin for the first thermoplastic resin layers. The thickness of each of the first layers and the second layers needs to be 0.05 to 0.3 μm to selectively reflect light by light interference between layers. The thickness of each of the first layers and the second layers is preferably 0.06 to 0.25 μm. The difference in thickness between the first layers and the second layers is preferably no more than 0.15 in terms of relative standard deviation. When this relative standard deviation is larger than 0.15, the peak of reflected light becomes broad, thereby making it difficult to obtain a distinct color. The relative standard deviation of the thickness of the first layers (or the second layers) can be obtained from the following expression.

$$\text{Relative standard deviation} = \sqrt{\sum_{i=1}^{n} \frac{(ti - \bar{t})^2}{n}} \Big/ \bar{t}$$

ti: thickness (μm) of each of the first layers (or the second layers)

t: average thickness value (μm) of the first layers (or the second layers)

n: number of the first layers (or the second layers)

The image display screen of the present invention is manufactured by alternately laminating at least 11 layers consisting of the first layers and the second layers. When the number of the layers is 10 or less, the reflection of light having a specific wavelength by light interference becomes unsatisfactory, thereby making it difficult to obtain the satisfactory visibility of a projected image on an image display screen. The lower limit of the total number of the first layers and the second layers is preferably 31 or more, particularly preferably 51 or more. The upper limit of the total number of the first layers and the second layers is not particularly limited but preferably 501 or less, particularly preferably 301 or less as the production process does not become excessively complicated.

The image display screen of the present invention has a parallel ray transmittance of 50% or more. The term "parallel ray transmittance" as used herein is a value measured by the method specified in JIS K6714-1958 and means the proportion of light passing straight through a film. When the parallel ray transmittance is lower than 50%, the image display screen becomes opaque and cannot obtain a design of interest. The parallel ray transmittance is preferably 60% or more, particularly preferably 75% or more.

The image display screen of the present invention must have a reflection peak with a specific form in its reflectance curve for each wavelength when light having a wavelength of 380 to 780 nm is projected thereon. Stated more specifically, the image display screen must have at least one reflection peak with a maximum reflectance at the apex 5 to 80% higher than the reflectance of the base line of the reflectance curve and a half-value width of 20 to 200 nm. For the sake of the convenience of explanation, (maximum reflectance−reflectance of the base line) will be referred to as "height of a reflection peak" hereinafter. The term "half-value width" as used herein means the wavelength range of the contour from the long-wavelength side to the short-wavelength side of a reflection peak at the middle point between the maximum reflectance and the reflectance of the base line. If there is no reflection peak with a reflection peak height of 5 to 80% and a half-value width value of 20 to 200 nm at a visible light having wavelength range of 380 to 780 nm, an image having an excellent color cannot be clearly displayed on the reflection side and the transmission side of an image display screen of interest. Stated more specifically, when the height of a reflection peak is smaller than 5%, the difference in color between the transmission side and the reflection side becomes unclear and when the height of the reflection peak is larger than 80%, the film itself is stained and apparently stained when an image is not projected thereon. When the half-value width is smaller than 20 nm, visible light having a specific wavelength cannot be reflected completely with the result that only an image having poor visibility can be displayed, and when the half-value width is larger than 200 nm, visible light having a wavelength which is desired to be transmitted is reflected, thereby making it impossible to display a high contrast image on the transmission side and the reflection side of the image display screen. The height of a reflection peak is preferably 15 to 60% and the half-value width of a reflection peak is preferably 30 to 150 nm, particularly preferably 50 to 100 nm.

Figure 1:
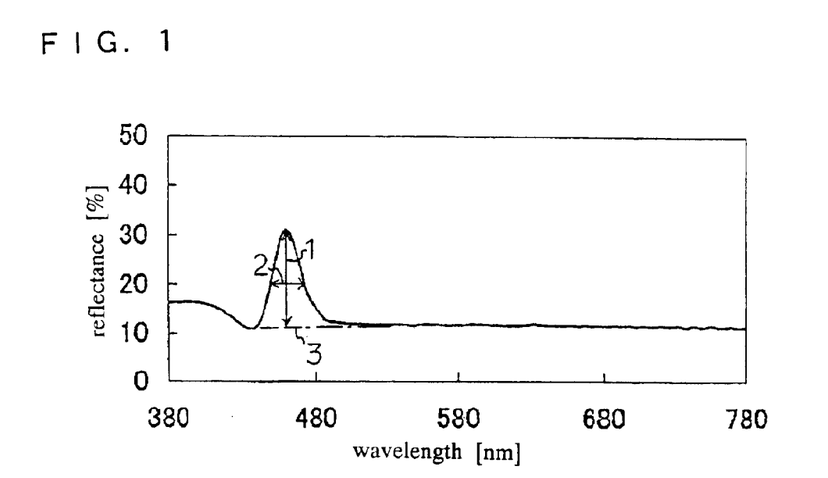
FIG. 1 is an example of a graph of the reflectance for the wavelength of light of the image display screen of the present invention.
Figure 2:
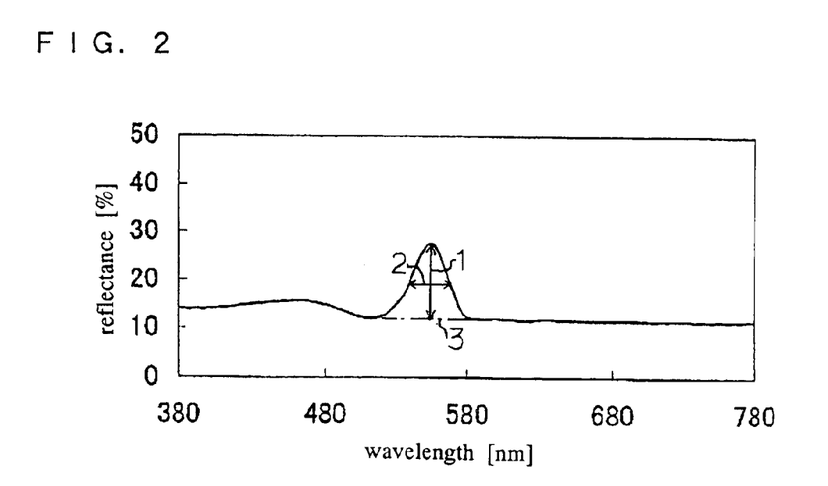
FIG. 2 is another example of a graph of the reflectance for the wavelength of light of the image display screen of the present invention.
Figure 3:
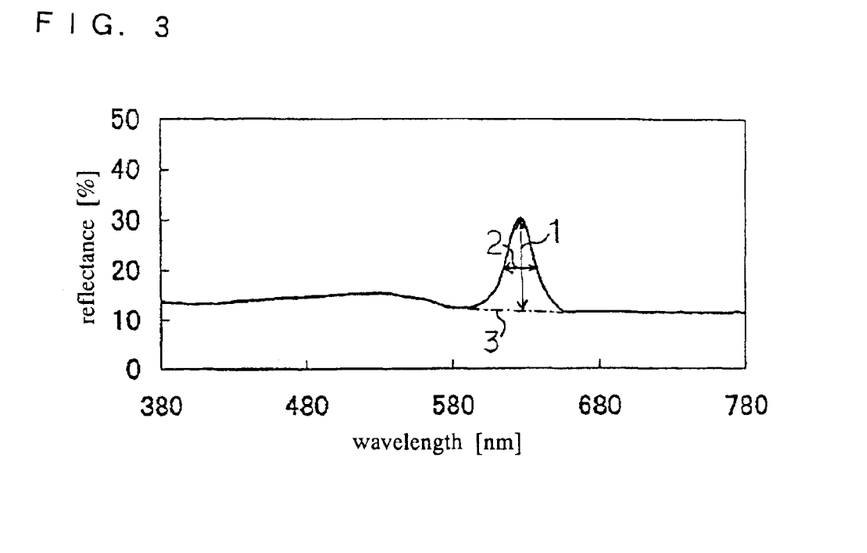
FIG. 3 is still another example of a graph of the reflectance for the wavelength of light of the image display screen of the present invention.
Figure 4:
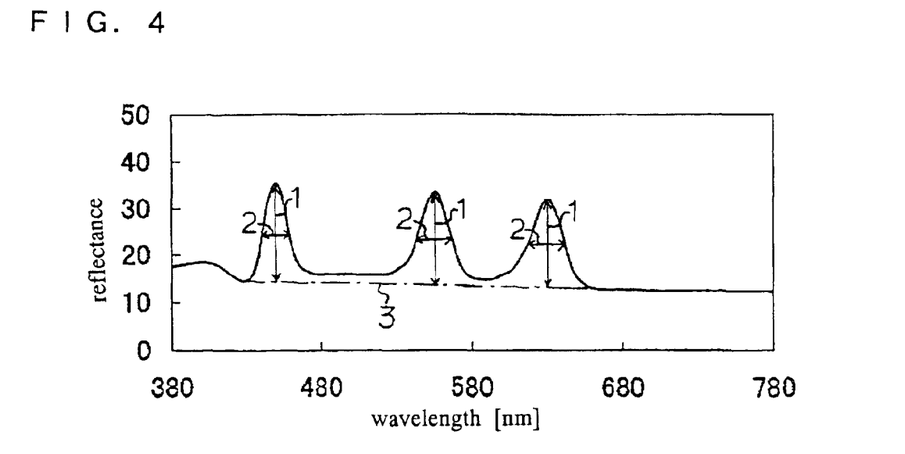
FIG. 4 is a further example of a graph of the reflectance for the wavelength of light of the image display screen of the present invention.

FIGS. 1 to 4 show examples of the reflectance curve of the screen of the present invention. FIG. 1 shows the reflectance curve of the blue light reflecting screen of the present invention. FIG. 2 shows the reflectance curve of the green light reflecting screen of the present invention. FIG. 3 shows the reflectance curve of the red light reflecting screen of the present invention. FIG. 4 shows the reflectance curve of blue light, green light and red light reflecting screen of the present invention. In FIGS. 1 to 4, reference numeral 1 denotes the height of a reflection peak, 2 denotes the half-value width of the reflection peak and 3 denotes the base line.

Figure 5:
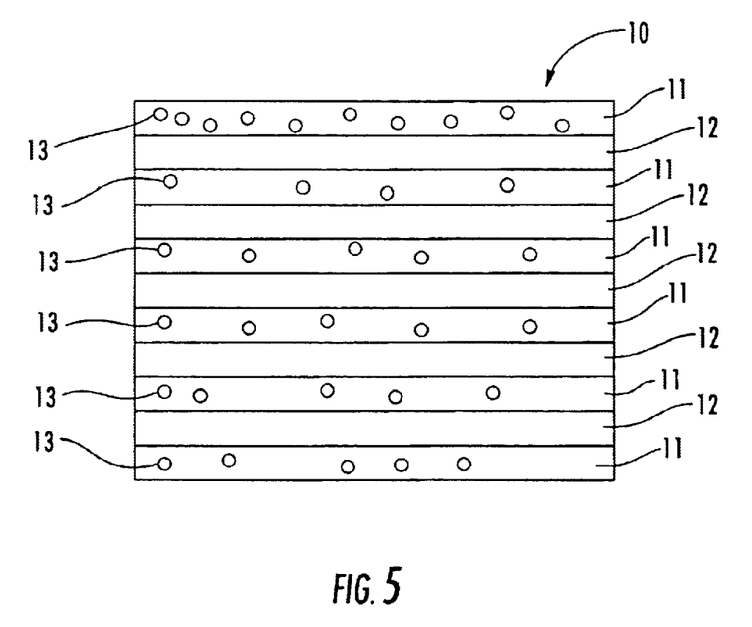
FIG. 5 shows an image display screen which comprises a multi-layer film comprising at least 11 layers formed by alternately laminating first thermoplastic resin layers with second thermoplastic resin layers where the first thermoplastic resin layers contain inert particles.

FIG. 5 illustrates an image display screen 10 comprising at least 11 layers formed by alternately laminating first thermoplastic resin layers 11 and second thermoplastic resin layers 12, where the first thermoplastic resin layers 11 contain inert particles 13.

The image display screen of the present invention may further comprise another layer on one side or both sides to adjust its total thickness or provide another function in limits that do not deteriorate its optical properties. The another layer is a transparent polyester film, anti-reflection layer, metal thin film or hard coat layer. The image display screen of the present invention may be laminated with another image display screen of the present invention which differs in reflectance and wavelength to be reflected from the above image display screen of the present invention.

In general, a projector for projecting visible light projects R (red), G (green) and B (blue) visible rays which are three primary colors of light to display an image. As for the wavelengths of these visible rays, the wavelength of the R (red) visible ray is 450 nm, that of the G (green) visible ray is 550 nm and that of the B (blue) visible ray is 620 nm. To display an image by using a projector which projects three primary colors of light, the image display screen of the present invention preferably has a reflection peak with a maximum reflectance wavelength of 420 to 480 nm, 520 to 580 nm or 590 to 650 nm and a height of 5 to 70%. The half-value width of the reflection peak is preferably in the range of 20 to 200 nm. Even when the image display screen has one reflection peak, it can stain an image the color of reflected light or transmitted light and can provide satisfactory visibility as an image display screen. However, it preferably has a plurality of reflection peaks because it can display more colors. Particularly preferably, it has a reflection peak with a maximum reflectance wavelength of 420 to 480 nm, 520 to 580 nm or 590 to 650 nm and a height of 5 to 70% higher than the base line of reflectance. To provide a plurality of reflection peaks to the image display screen of the present invention, two or more image display screens of the present invention which have different reflection peaks may be assembled together, or the thickness of each layer of the image display screen of the present invention may be changed. To reflect a plurality of rays, the half-value width of the reflection peak is preferably in the range of 20 to 100 nm. When the half-value width of the reflection peak is smaller than 20 nm, the reflection of a primary color (red, green or blue) is not satisfactory and a reflection image having high visibility cannot be obtained and when the half-value width of the reflection peak is larger than 100 nm, even a color between primary colors (red, green or blue) is reflected with the result that colors are mixed and it is therefore difficult to obtain a high-contrast image.

The above optical properties are caused by a difference in refractive index between the first layers and the second layers. In the present invention, high-refractive index layers may be referred to as "first layers" and low-refractive index layers may be referred to as "second layers" hereinafter for the sake of the convenience of explanation. That is, in the image display screen of the present invention, the refractive index of the first layers is higher than that of the second layers in at least one direction on the plane of the screen. This refractive index difference is obtained in at least one direction on the plane of the film by using thermoplastic resins having different refractive indices in the first layers and the second layers, adjusting stretching conditions using thermoplastic resins having the same refractive index in the first layers and the second layers, or using both. The refractive index difference is preferably in the range of 0.02 to 0.10 in at least one direction on the plane of the screen. When the refractive index difference is smaller than 0.02, the reflectance lowers and the satisfactory visibility of a projected image is hardly obtained by the image display screen. When the refractive index difference is larger than 0.10, reflection becomes too strong and the transparency of the image display screen is lost or the visibility of an image projected onto the transmission side is lost. The refractive index difference between the first layers and the second layers in at least one direction on the film plane is more preferably 0.03 to 0.90, particularly preferably 0.04 to 0.80.

Since the reflection wavelength is changed by the optical path length of a screen manufactured by using different resins, it is shifted by the incident angle of a ray. In order to suppress the shift of the reflection wavelength by the incident angle of a ray, it is preferred to use a polyester having anisotropy in positive refractive index as the thermoplastic resin for the first layers or the second layers so that the refractive index in at least one direction on the film plane can be made higher than the refractive index in a thickness direction by stretching. It is particularly preferred that either the first layers or the second layers, particularly both layers have a refractive index in at least one direction on the film plane 0.10 or more higher than a refractive index in the thickness direction. The dependency upon incident angle of a ray is reduced by satisfying the above requirement for refractive index. The particularly preferred polyester comprises ethylene terephthalate or ethylene-2,6-naphthalene dicarboxylate as the main recurring unit (preferably 80 mol % or more) because it has excellent mechanical properties and film forming properties. Since a polyester comprising ethylene-2,6-naphthalene dicarboxylate as the main recurring unit shows a relatively higher refractive index than a polyester comprising ethylene terephthalate as the main recurring unit, the first layers preferably contain a larger amount of ethylene-2,6-naphthalene dicarboxylate as a recurring unit than the second layers and the second layers preferably contain a larger amount of ethylene terephthalate as a recurring unit than the first layers.

A detailed description is subsequently given of the first layers and the second layers in the image display screen of the present invention.

The thermoplastic resins for the first layers and the second layers are not particularly limited if they are transparent, as exemplified by polyesters, polyamides, polyacrylics and polystyrenes. Out of these, polyesters are preferred, and polyesters comprising ethylene terephthalate (may be abbreviated as ET hereinafter) or ethylene-2,6-naphthalene dicarboxylate (may be abbreviated as EN hereinafter) as the main recurring unit are particularly preferred for the reason given above. A polyester comprising an ET or EN component in an amount of 80 mol % or more based on the total of all the recurring units of the first and second layers is particularly preferred because it can easily improve adhesion between layers. When the amount of the ET or EN component is smaller than 80 mol % based on the total of all the recurring units of the first and second layers, the polyesters for the first layers and the second layers greatly differ from each other in composition with the result of poor adhesion between layers whereby the layers may peel off.

A comonomer other than the ET or EN component contained in a polyester comprising the ET or EN component as the main recurring unit, that is, polyethylene terephthalate (may be abbreviated as PET hereinafter) or polyethylene-2,6-naphthalene dicarboxylate (may be abbreviated as PEN hereinafter) is selected from aromatic dicarboxylic acids such as terephthalic acid (only for PEN), isophthalic acid, 2,6-naphthalenedicarboxylic acid (only for PET) and 2,7-naphthalenedicarboxylic acid, aliphatic dicarboxylic acids such as adipic acid, azelaic acid, sebacic acid and decanedicarboxylic acid, alicyclic dicarboxylic acids such as cyclohexanedicarboxylic acid, aliphatic diols such as butanediol and hexanediol, and alicyclic diols such as cyclohexanedimethanol.

The image display screen of the present invention is obtained by suitably selecting a thermoplastic resin for each layer from the above thermoplastic resins to ensure that the refractive index of the first layers should be higher than the refractive index of the second layers. Preferred combinations of thermoplastic resins are explained below.

Combination (1) of Thermoplastic Resins for the First Layers and the Second Layers PEN comprising ethylene-2,6-naphthalene dicarboxylate in an amount of 95 mol % or more based on the total of all the recurring units is used as the thermoplastic resin for the first layers and PEN comprising ethylene-2,6-naphthalene dicarboxylate in an amount of 60 to 97 mol % of the total of all the recurring units and having a lower refractive index or lower melting point than PEN for the fist layers is used as the thermoplastic resin for the second layers. In this case, in order to produce a refractive index difference or melting point difference, the amount of the comonomer is preferably made larger in the second layers than in the first layers. As means of increasing the amount of the comonomer, PEN comprising a large amount of the comonomer is not only used, but also homo-PEN and homo-PET are prepared and subjected to ester exchange by melt kneading in a film forming step to obtain co-PEN having composition of interest. Since this combination includes high-refractive index PEN for the first layers, it can easily increase reflectance and is excellent in adhesion between layers because the thermoplastic resins for the both layers are almost the same in composition.

Combination (2) of Thermoplastic Resins for the First and Second Layers

PET comprising ethylene terephthalate in an amount of 95 mol % or more based on the total of all the recurring units is used as the thermoplastic resin for the first layers and PET comprising ethylene terephthalate in an amount of 60 to 97 mol % based on the total of all the recurring units and having a lower refractive index or lower melting point than PET for the first layers is used as the thermoplastic resin for the second layers. In this case, in order to produce a refractive index difference or melting point difference, the amount of the comonomer is preferably made larger in the second layers than in the first layers. As means of increasing the amount of the comonomer, PET comprising a large amount of the comonomer is not only used, but also homo-PEN and homo-PET are prepared and subjected to ester exchange by melt kneading in a film forming step to obtain co-PET having composition of interest. Since this combination includes high-refractive index PET for the first layers, it can easily increase reflectance and is excellent in adhesion between layers because the thermoplastic resins for the both layers are almost the same in composition. Compared with PEN, a whitening phenomenon (delamination) which usually occurs at the time of bending hardly occurs and accordingly, handling properties are excellent.

Combination (3) of Thermoplastic Resins for the First and Second Layers

PET comprising ET in an amount of 85 mol % or more based on the total of all the recurring units is used as the thermoplastic resin for the first layers and PEN comprising ET in an amount of 20 to 40 mol % and EN in an amount of 60 to 80 mol % based on the total of all the recurring units and having a lower refractive index or lower melting point than PET for the first layers is used as the thermoplastic resin for the second layers. In this case, in order to produce a refractive index difference or melting point difference, the amount of the comonomer is preferably made larger in the second layers than in the first layers. As means of increasing the amount of the comonomer, PET comprising a large amount of the comonomer is not only used, but also homo-PEN and homo-PET are prepared and subjected to ester exchange by melt kneading in a film forming step to obtain co-PET having composition of interest.

In order to produce a refractive index difference between the first layers and the second layers by a melting point difference between the resins for the layers, the thermoplastic resin for the second layers is preferably a copolyester having a melting point of 210 to 245° C., particularly preferably co-PEN or co-PET having a melting point of 210 to 245° C. When the melting point of the copolyester is lower than 210° C., the crystallinity of the polymer becomes too low, thereby making it difficult to form a film or reducing the heat resistance of the second layers excessively in some cases. When the melting point of the copolyester is higher than 245° C., the orientation and crystallization of the second layers proceed easily at the time of stretching the resulting laminate consisting of the first layers and the second layers, thereby making it difficult to obtain a screen having a large difference in refractive index. The difference in melting point between the first layers and the second layers is preferably at least 15° C. because only the refractive index of the second layers can be selectively reduced by heat setting.

The melting point and Tg of the above copolyester can be adjusted by suitably selecting the type and amount of the above comonomer. Isophthalic acid is preferred out of the above comonomers and its amount is preferably 4 to 18 mol %, more preferably 8 to 15 mol %. The intrinsic viscosity (orthochlorophenol, 35° C.) of the above copolyester is preferably 0.45 to 0.8, more preferably 0.5 to 0.7.

A description is subsequently given of a preferred embodiment of the image display screen of the present invention.

At least one of the thermoplastic resins for the first layers and the second layers contains inert particles having an average particle diameter of preferably 0.01 to 5 μm, more preferably 0.01 to 2 μm, much more preferably 0.05 to 1 μm, particularly preferably 0.1 to 0.3 μm in an amount of preferably 0.001 to 5 wt % based on the weight of the multilayer film, more preferably 0.001 to 0.5 wt %, much more preferably 0.005 to 0.2 wt % so as to improve the winding properties of a film. When the average particle diameter of the inert particles is smaller than 0.01 μm or the content of the inert particles is smaller than 0.001 wt %, the improvement of the winding properties of the film becomes unsatisfactory. Even when inert particles having an average particle diameter of more than 5 μm are added or inert particles are added in an amount of more than 5 wt %, the effect of improving winding properties is rarely obtained.

Examples of the inert particles include inorganic inert particles such as silica, alumina, calcium carbonate, calcium phosphate, kaolin and talc, and organic inert particles such as silicone, crosslinked polystyrene and styrene-divinylbenzene copolymer. The above inert particles are preferably globular particles (may be called "spherical particles" hereinafter) having a long diameter/short diameter ratio of preferably 1.2 or less, more preferably 1.1 or less from the viewpoint of balance between the slipperiness and optical properties of the obtained film. The inert particles preferably have a sharp particle size distribution, for example, a relative standard deviation of preferably less than 0.3, more preferably less than 0.2. When particles having a large relative standard deviation are used, the frequency of coarse particles becomes large, whereby an optical defect may occur.

The average particle diameter, particle diameter ratio and relative standard deviation of the inert particles are calculated by forming an extremely thin metal layer on the surface of each particle by sputtering to provide conductivity, obtaining the long diameter, short diameter and area circle equivalent diameter of the particle from an image enlarged to 10,000 to 30,000 times by an electron microscope and inserting these values into the following expressions.

Average particle diameter=total of area circle equivalent diameters of measured particles/number of particles Particle diameter ratio=average long diameter of particles/average short diameter of particles It is preferred to avoid use of particles which function as a pigment such as titanium oxide or zinc sulfide or stained particles as the inert particles as much as possible because they deteriorate optical properties. Particularly preferably, the above inert particles are contained in the first layers and substantially not contained in the second layers.

It is preferred that the inert particles be contained because they suitably scatter light selectively reflected by the screen to make images on the projection side and the transmission side more clear. If the inert particles are not contained in the first layers and the second layers, light from a light source will be all reflected specularly, whereby it is difficult to see a displayed image according to angle, the winding properties of the screen may deteriorate, or handling properties of the screen may lower.

The inert particles preferred from the viewpoint of visibility are inorganic inert particles such as silica, alumina, calcium carbonate, calcium phosphate, kaolin or talc, or organic inert particles such as silicone, crosslinked polystyrene or styrene-divinylbenzene copolymer. The average particle diameter of the inert particles preferred from the viewpoint of visibility is preferably 0.1 to 5 μm, more preferably 0.3 to 3 μm, particularly preferably 1 to 3 μm. The content of the inert particles preferred from the viewpoint of visibility is preferably 0.01 to 0.5 wt %, more preferably 0.05 to 0.2 wt % based on the weight of the first layer or the second layer. When the average particle diameter or content of the inert particles falls below the above lower limit, the obtained effect of improving definition may become unsatisfactory. When the average particle diameter or content of the inert particles exceeds the above upper limit, the deterioration of optical properties by the particles may become marked or the parallel ray transmittance of the entire film may become less than 60%.

A description is subsequently given of an example of the method of producing the screen of the present invention.

In the method of producing the screen of the present invention, a laminated unstretched film is first produced by simultaneous multi-layer extrusion using a feed block. That is, a molten thermoplastic resin for forming the first layers (for example, a mixture of PET containing inert particles) and a molten polymer for forming the second layers (for example, co-PET) are laminated together alternately using the feed block in such a manner that both end layers are first layers and supplied into a die to be extruded. At this point, the polymers laminated together by the feed block are still laminated together. A sheet extruded from the die is solidified by cooling on a casting drum to become a multi-layer laminated unstretched film. This unstretched multi-layer laminated film is stretched in at least one direction, preferably two directions to become a screen. The stretching temperature is preferably Tg of the polymer for the first layers to (Tg+50° C.). The draw ratio is preferably 2 to 10 times in the case of uniaxial stretching and the stretching direction may be a film forming direction (may be referred to as "longitudinal direction" or "mechanical direction" in the present invention) or a direction perpendicular to the film forming direction (may be referred to as "transverse direction" or "crosswise direction" in the present invention). In the case of biaxial stretching, the draw ratio in the longitudinal direction and the transverse direction is preferably 1.2 times or more, more preferably 1.5 times or more which is 5 to 25 times in terms of area draw ratio. As the draw ratio increases, the thickness before stretching can be made larger. In addition, when the differences in thickness among the layers of the multi-layer laminated unstretched film are the same, the differences in thickness after stretching can be made smaller as the draw ratio is higher with the result that light interference in each layer is expanded to increase reflectance advantageously. From this point of view, the area ratio is preferably 8 times or more, more preferably 10 times or more. A known stretching technique such as sequential biaxial stretching, simultaneous biaxial stretching, tubular stretching or inflation stretching can be employed. Out of these, sequential stretching is preferred from the viewpoints of productivity and quality. The stretched film is preferably heated (heat set) for thermal stabilization. The heating temperature is preferably (TmA−60)° C. to (TmA−10)° C. (TmA is the melting point of the polymer for the first layers). To selectively reduce the refractive index of the second layers by heating, the heat treatment is preferably carried out at (TmB−10)° C. to (TmA−10)° C. (TmB is the melting point of the polymer for the second layers).

The above screen may have an adhesive layer (preferably a slippery and adhesive layer) on at least one side thereof. The purpose of forming the adhesive layer is to provide adhesion to a hard coat layer or pressure-sensitive adhesive layer to be formed on the screen and slipperiness to the film and prevent reflection at the interface between the film and the hard coat layer or pressure-sensitive adhesive layer. An adhesive layer known per se may be suitably selected.

The image projection screen of the present invention is preferably assembled with a transparent substrate such as a glass substrate to be used as a transparent image display in order to project an image by means of a liquid crystal projector. The image projection screen of the present invention preferably comprises an adhesive layer on both sides, a pressure-sensitive adhesive layer on one side and a hard coat layer on the other side. Like the above adhesive layer, a hard coat layer and pressure-sensitive adhesive layer known per se may be suitably selected. As described above, a plurality of reflection peaks having different wavelengths are preferably provided by assembling together a plurality of image display screens of the present invention which differ in reflection peak or by changing the thickness of each layer of the image display screen of the present invention. Particularly, the image display screen of the present invention having reflection peaks with maximum reflectance wavelengths of 420 to 480 nm, 520 to 580 nm and 590 to 650 nm can selectively reflect all three primary colors of light i.e., red, green and blue projected from a projector, thereby making it possible to display a full-color image clearly.

An image display device having a new design which is not seen in the prior art and excellent visibility can be obtained by assembling the thus obtained image display screen of the present invention with a transparent substrate such as a glass substrate and combining the assembly with a projector typified by a liquid crystal projector which projects light having a wavelength of 380 to 780 nm,

EXAMPLES

The following examples are provided to further illustrate the present invention. The physical properties in examples were measured by the following methods.

(1) Parallel Ray Transmittance and Haze Value

The total light transmittance Tt (%) and the scattered light transmittance Td (%) were measured with the haze measuring instrument (NDH-20) of Nippon Denshoku Kogyo Col., Ltd. in accordance with JIS K6714-1958. The parallel ray transmittance Tp (%) is obtained from the following expression.

$$T(p) = T(t) - T(d)$$

The haze (%) was calculated from the measured total light transmittance Tt(%) and the measured scattered light transmittance Td(%) based on the following expression.

$$\text{Haze } (\%) = T(d)/T(t) \times 100$$

(2) Refractive Index in Direction on Film Plane

The refractive index (nx) in the mechanical direction and the refractive index (ny) in the crosswise direction of the film were measured by attaching a polarizer analyzer to the eyepiece side of an Abbe refractometer (4T Abbe refractometer of Atago Co., Ltd.) and using sulfur methylene iodide as a mount solution and a monochromatic and-ray at a measurement temperature of 25° C. Two boundary lines of refractive index in each direction were confirmed on the sample and the measurement values were taken as the refractive index of the first layers and the refractive index of the second layers.

(3) Thickness of Each Layer (Maximum Thickness and Minimum Thickness)

A triangular sample was cut out, fixed in an embedding capsule and embedded with an epoxy resin. The embedded sample was sliced in a longitudinal direction to obtain a thin film having a thickness of 50 nm measured with a microtome (ULTRACUT-S of Raihelt Co., Ltd.) and its cross section was observed and photographed by a transmission electron microscope (JEM2010 of JEOL Ltd.) at an acceleration voltage of 100 kV to measure the thickness of each layer from the obtained photomicrograph.

(4) Height of Reflection Peak

The relative mirror reflectance from an aluminum deposited mirror at each wavelength was measured at a wavelength of 380 to 780 nm using the UV-3101 spectrophotometer of Shimadzu Corporation. The maximum reflectance was taken as the maximum reflection peak and the height from the base line of the peak was taken as the height of the reflection peak.

(5) Half-value Width of Peak

The same measurement as that of the maximum reflectance was carried out, the wavelength value on the short wavelength side and the wavelength value on the long wavelength side of a wavelength range where the height of a reflection peak became half were taken as short-wavelength side and long-wavelength side peak half-value width wavelengths, respectively, and the difference between them was taken as a peak half-value width.

(6) Melting Point (Tm) and Glass Transition Point (Tg)

20 mg of a sample was collected and its glass transition point and melting point were measured at a temperature elevation rate of 20° C./min with DSC (manufactured by TA Instruments Co., Ltd. under the trade name of DSC2920).

(7) Visibility of Projected Image

Red, green, blue and full-color images were projected from a liquid crystal projector by assembling a sample with a 10 mm glass substrate. The projected images were observed from the reflection side and the transmission side under illumination by a 30-lux fluorescent lamp to evaluate the visibility of each of the images.

◎: Color contrast is high and an image can be clearly seen

○: Color cannot be clearly seen but a projected character can be read

Δ: Display of an image can be confirmed but its contents cannot be identified

X: Display of an image cannot be confirmed (8) Transparency

The visibility of a scene on the opposite side was evaluated based on the following three criteria under illumination by a 30-lux fluorescent lamp by assembling a sample with a 10 mm-thick glass substrate.

3: An image on the opposite side can be clearly seen without any clouding

2: An image on the opposite side can be seen but its contrast is low and clouding is slightly perceived.

1: An image on the opposite side is totally invisible

Example 1

Polyethylene terephthalate (PET) containing 0.10 wt % of spherical silica particles (average particle diameter: 1.5 μm, long diameter/short diameter ratio: 1.02, average deviation of particle diameter: 0.1) and having an intrinsic viscosity (orthochlorophenol, 35° C.) of 0.63 was prepared as the resin for the first layers and copolyethylene terephthalate containing 10 mol % of isophthalic acid (intrinsic viscosity of 0.68, orthochlorophenol, 35° C.) was prepared as the resin for the second layers.

After the resin for the first layers was dried at 160° C. for 3 hours and the mixed resin for the second layers was dried at 160° C. for 3 hours, they were supplied into an extruder to be molten, the polymer for the first layers was divided into 101 layers, the polymer for the second layers was divided into 100 layers, a multi-layer feed block device was used to laminate the first layers with the second layers alternately, and the laminated layers were guided into a die and cast onto a casting drum in order to produce a laminated unstretched sheet consisting of the 201 first and second layers laminated alternately. The ratio of the extrusion of the second layer to the extrusion of the first layer was adjusted to 1:0.8 and the both end layers of the laminate were the second layers. This laminated unstretched sheet was stretched to 3.6 times in a longitudinal direction at 85° C. and to 3.9 times in a transverse direction at 90° C. and heat set at 205° C. for 3 seconds to obtain an image display screen.

The above production conditions are shown in Table 1, the characteristic properties of the obtained image display screen are shown in Table 2, and the reflectance for the wavelength of light is shown in FIG. 1.

When the obtained image display screen was assembled with a 10 mm glass plate using a pressure-sensitive adhesive sheet (HJ-3160W pressure-sensitive adhesive double-coated tape of Nitto Denko Corporation) and white light (red, green and blue rays) was projected onto the screen on the glass plate by a liquid crystal projector under illumination by a 30-lux fluorescent lamp, a blue image could be displayed from the reflection side and a yellow image could be displayed from the transmission side at a high contrast. The transparency was extremely high. The characteristic properties of the obtained image display surface are shown in Table 3.

Example 2

The procedure of Example 1 was repeated except that the production conditions were changed as shown in Table 1. The characteristic properties of the obtained image display screen are shown in Table 2 and the reflectance for the wavelength of light is shown in FIG. 2.

When the obtained image display screen was assembled with a 10 mm glass plate using the above pressure-sensitive adhesive sheet and white light (red, green and blue rays) was projected onto the screen on the glass plate by a liquid crystal projector under illumination by a 30-lux fluorescent lamp, a green image could be displayed from the reflection side at a high contrast and a purple image could be displayed from the transmission side at a high contrast. The transparency was extremely high. The characteristic properties of the obtained image display surface are shown in Table 3.

Example 3

The procedure of Example 1 was repeated except that the production conditions were changed as shown in Table 1. The characteristic properties of the obtained image display screen are shown in Table 2 and the reflectance for the wavelength of light is shown in FIG. 3.

When the obtained image display screen was assembled with a 10 mm glass plate using the above pressure-sensitive adhesive sheet and white light (red, green and blue rays) was projected onto the screen on the glass plate by a liquid crystal projector under illumination by a 30-lux fluorescent lamp, a red image could be displayed from the reflection side at a high contrast and a water color image could be displayed from the transmission side at a high contrast. The transparency was extremely high. The characteristic properties of the obtained image display surface are shown in Table 3.

Examples 4 to 9

The procedure of Example 1 was repeated except that the resins for the first layers and the second layers, the inert particles and the production conditions were changed as shown in Table 1. The characteristic properties of the obtained image display screens are shown in Table 2. The characteristic properties of the obtained image display surfaces are shown in Table 3.

Example 10

The image display screens produced in Examples 1 to 3 were assembled together by a pressure-sensitive adhesive sheet and this assembly was further assembled with a 10 mm-thick glass plate by the above pressure-sensitive adhesive sheet. When an image was projected onto the screen on the glass plate by a liquid crystal projector under illumination by a 30-lux fluorescent lamp, a full-color image could be displayed from both the reflection side and the transmission side at a high contrast. The characteristic properties of the obtained image display surface are shown in Table 3 and the reflectance for the wavelength of light of the image display screen is shown in FIG. 4.

Example 11

The image display screens produced in Examples 7 to 9 were assembled together by a pressure-sensitive adhesive sheet and this assembly was further assembled with a 10 mm-thick glass plate by the above pressure-sensitive adhesive sheet. When an image was projected onto the screen on the glass plate by a liquid crystal projector under illumination by a 30-lux fluorescent lamp, a full-color image could be displayed from both the reflection side and the transmission side at a high contrast. The characteristic properties of the obtained image display surface are shown in Table 3.

Comparative Example 1

When the mat film (TW-75) of Teijin Du Pont Film Japan Ltd. was assembled with a 10 mm glass plate by the above pressure-sensitive adhesive sheet and an image was projected onto the film on the glass plate by a liquid crystal projector under illumination by a 30-lux fluorescent lamp, the image could be displayed at a high contrast but an image on the transmission side and an image on the reflection side had the same color. The film had no transparency. The characteristic properties of the image display surface are shown in Table 3.

Comparative Example 2

When the hologram screen (Glass Vision Sheet 40) of Canon Sales Co., Ltd. was assembled with a 10 mm glass plate by the above pressure-sensitive adhesive sheet and an image was projected onto the film on the glass plate by a liquid crystal projector under illumination by a 30-lux fluorescent lamp, an extremely high-contrast image could be displayed from the transmission side but hardly seen from the reflection side. The transparency was much higher than in Comparative Example 1 but the image was slightly clouded. The characteristic properties of the image display surface are shown in Table 3.

TABLE 1

| | first layers | | | second layers | | |
|---|---|---|---|---|---|---|
| | number of layers- | type of resin- | inert particles (amount)- (wt %) | number of layers- | type of resin- | inert particles (amount)- (wt %) |
| Ex. 1 | 101 | H | A(0.05) | 100 | I | none |
| Ex. 2 | 101 | H | A(0.05) | 100 | I | none |
| Ex. 3 | 101 | H | A(0.05) | 100 | I | none |
| Ex. 4 | 101 | J | B(0.05) | 100 | K | none |
| Ex. 5 | 101 | J | B(0.05) | 100 | K | none |
| Ex. 6 | 101 | J | B(0.05) | 100 | K | none |
| Ex. 7 | 101 | M | C(0.05) | 100 | L | none |
| Ex. 8 | 101 | M | C(0.05) | 100 | L | none |
| Ex. 9 | 101 | M | C(0.05) | 100 | L | none |

TABLE 1-continued

| | production conditions | | | | | |
|---|---|---|---|---|---|---|
| | stretching in longitudinal direction | | stretching in transverse direction | | | film |
| | temperature (° C.) | draw ratio (–) | temperature (° C.) | draw ratio (–) | heat setting temperature ° C. | thickness μm |
| Ex. 1 | 85 | 3.6 | 90 | 3.9 | 205 | 13 |
| Ex. 2 | 85 | 3.6 | 90 | 3.9 | 205 | 16 |
| Ex. 3 | 85 | 3.6 | 90 | 3.9 | 205 | 18 |
| Ex. 4 | 120 | 3.6 | 125 | 3.9 | 230 | 13 |
| Ex. 5 | 120 | 3.6 | 125 | 3.9 | 230 | 16 |
| Ex. 6 | 120 | 3.6 | 125 | 3.9 | 230 | 18 |
| Ex. 7 | 120 | 3.6 | 115 | 3.9 | 200 | 13 |
| Ex. 8 | 120 | 3.6 | 115 | 3.9 | 200 | 16 |
| Ex. 9 | 120 | 3.6 | 115 | 3.9 | 200 | 18 |

Ex.: Example

TABLE 2

| | thickness of each layer | | refractive index in film forming direction | | refractive index in crosswise direction | |
|---|---|---|---|---|---|---|
| | first layer [μm] | second layer [μm] | high- refractive index side [–] | low- refractive index side [–] | high- refractive index side [–] | low- refractive index side [–] |
| Ex. 1 | 0.06 | 0.05 | 1.660 | 1.625 | 1.656 | 1.629 |
| Ex. 2 | 0.08 | 0.06 | 1.659 | 1.628 | 1.655 | 1.622 |
| Ex. 3 | 0.09 | 0.07 | 1.662 | 1.622 | 1.656 | 1.633 |
| Ex. 4 | 0.06 | 0.05 | 1.732 | 1.682 | 1.741 | 1.677 |
| Ex. 5 | 0.08 | 0.06 | 1.730 | 1.679 | 1.739 | 1.679 |
| Ex. 6 | 0.09 | 0.07 | 1.732 | 1.678 | 1.738 | 1.680 |
| Ex. 7 | 0.06 | 0.05 | 1.677 | 1.632 | 1.679 | 1.631 |
| Ex. 8 | 0.08 | 0.06 | 1.672 | 1.631 | 1.676 | 1.630 |
| Ex. 9 | 0.09 | 0.07 | 1.678 | 1.632 | 1.677 | 1.631 |

| | melting point peak before laminating measured by DSC | | reflection wavelength [nm] | height of reflection peak [%] | half-value width [nm] |
|---|---|---|---|---|---|
| | at a side of high temperature [° C.] | at a side of low temperature [° C.] | | | |
| Ex. 1 | 254 | 230 | 456 | 17 | 21 |
| Ex. 2 | 254 | 230 | 546 | 14 | 23 |
| Ex. 3 | 254 | 230 | 622 | 17 | 22 |
| Ex. 4 | 265 | 240 | 445 | 51 | 38 |
| Ex. 5 | 265 | 240 | 553 | 45 | 42 |
| Ex. 6 | 265 | 240 | 621 | 44 | 43 |
| Ex. 7 | 230 | 200 | 444 | 51 | 48 |
| Ex. 8 | 230 | 200 | 561 | 45 | 53 |
| Ex. 9 | 230 | 200 | 630 | 44 | 55 |

Ex.: Example

TABLE 3

| | total light transmittance [%] | parallel ray transmittance [%] | haze [%] | visibility of image (transmission side) | | | | visibility of image (reflection side) | | | | transparency |
|---|---|---|---|---|---|---|---|---|---|---|---|---|
| | | | | blue | green | red | full-color | blue | green | red | full-color | |
| Ex. 1 | 90 | 85 | 5 | ⊚ | X | X | ○ | ⊚ | X | X | ○ | 3 |
| Ex. 2 | 86 | 81 | 6 | X | ⊚ | X | ○ | X | ⊚ | X | ○ | 3 |
| Ex. 3 | 87 | 84 | 4 | X | X | ⊚ | ○ | X | X | ⊚ | ○ | 3 |
| Ex. 4 | 89 | 85 | 4 | ⊚ | X | X | ○ | ⊚ | X | X | ○ | 3 |
| Ex. 5 | 85 | 81 | 4 | X | ⊚ | X | ○ | X | ⊚ | X | ○ | 3 |
| Ex. 6 | 87 | 83 | 4 | X | X | ⊚ | ○ | X | X | ⊚ | ○ | 3 |
| Ex. 7 | 89 | 86 | 3 | ⊚ | X | X | ○ | ⊚ | X | X | ○ | 3 |
| Ex. 8 | 78 | 74 | 4 | X | ⊚ | X | ○ | X | ⊚ | X | ○ | 3 |
| Ex. 9 | 86 | 82 | 4 | X | X | ⊚ | ○ | X | X | ⊚ | ○ | 3 |
| Ex. 10 | 78 | 60 | 18 | ⊚ | ⊚ | ⊚ | ⊚ | ⊚ | ⊚ | ⊚ | ⊚ | 3 |
| Ex. 11 | 64 | 54 | 10 | ⊚ | ⊚ | ⊚ | ⊚ | ⊚ | ⊚ | ⊚ | ⊚ | 3 |
| C. Ex. 1 | 60 | 18 | 70 | ○ | ○ | ○ | ○ | ○ | ○ | ○ | ○ | 1 |
| C. Ex. 2 | 65 | 40 | 38 | ⊚ | ⊚ | ⊚ | ⊚ | X | X | X | X | 2 |

Ex.: Example
C. Ex.: Comparative Example

The inert particles shown in Table 1 are given below. Inert particles A: spherical silica particles (average particle diameter: 1.5 μm, long diameter/short diameter ratio: 1.02, average deviation of particle diameter: 0.1) Inert particles B: bulk calcium carbonate (average particle diameter: 1.0 μm, long diameter/short diameter ratio: 1.4, average deviation of particle diameter: 0.25) Inert particles C: spherical silicone (average particle diameter: 1.5 μm, long diameter/short diameter ratio: 1.1, average deviation of particle diameter: 0.30)

The types of resins for the first layers or the second layers shown in Table 1 are given below.

Resin H: polyethylene terephthalate (intrinsic viscosity of 0.64, orthochlorophenol, 35° C.)
Resin I: copolyethylene terephthalate comprising 10 mol % of isophthalic acid (intrinsic viscosity of 0.68, orthochlorophenol, 35° C.)
Resin J: polyethylene-2,6-naphthalate (intrinsic viscosity of 0.62, orthochlorophenol, 35° C.)
Resin K: copolyethylene-2,6-naphthalate comprising 10 mol % of isophthalic acid (intrinsic viscosity of 0.64, orthochlorophenol, 35° C.)
Resin L: mixture of polyethylene-2,6-naphthalate (intrinsic viscosity of 0.62, orthochlorophenol, 35° C.) and polyethylene terephthalate (intrinsic viscosity of 0.64, orthochlorophenol, 35° C.) in a weight ratio of 70:30
Resin M: copolyethylene terephthalate comprising 12 mol % of 2,6-naphthalenedicarboxylic acid (intrinsic viscosity of 0.68, orthochlorophenol, 35° C.)

The image display screen of the present invention can be produced under film forming conditions as shown in Table 1 and selectively reflects light having a specific wavelength without losing its transparency as shown in Table 2. An image can be displayed on both the transmission side and the reflection side while transparency is maintained, which is not achieved in Comparative Examples 1 and 2 as shown in Table 3, by assembling this multi-layer stretched film with a glass substrate.

Since the image display screen of the present invention can reflect at least part of visible light without losing its transparency as described above, a highly transparent and new design which is not obtained in the prior art, that is, images having different colors can be displayed on the reflection side and the transmission side at the same time while the definition of the image is maintained. Therefore, when the screen of the present invention is put on the window glass of a shop which is open till very late at night and an image is displayed on the screen by a liquid crystal projector, the information of the image can be acquired from inside while an outside scene is seen and the information of the image can be seen from a distant view of outside room. Therefore, when the image display device of the present invention is used, an unpleasant feeling given to residents living nearby can be reduced even if an advertisement is displayed in the middle of night, thereby making it possible to carry out efficient propaganda activities.

What is claimed is:

1. An image display screen which comprises (1) a multi-layer film comprising at least 11 layers and formed by alternately laminating first thermoplastic resin layers having a thickness of 0.05 to 0.3 μm with second thermoplastic resin layers having a thickness of 0.05 to 0.3 μm and which has (2) a reflection peak with a maximum reflectance 5 to 80% higher than the base line of reflectance and a half-value width of 20 to 200 nm in its reflectance curve for visible light having a wavelength of 380 to 780 μm and (3) a parallel ray transmittance of 50% or more, wherein a difference in melting point measured by DSC between the first thermoplastic resin and the second thermoplastic resin before the multi-layer film is formed therefrom is at least 15° C., and:
   wherein the first thermoplastic resin and the second thermoplastic resin are both polyesters and contain ethylene terephthalate in an amount of 80 mol % or more based on the total of all the recurring units of all the polyesters, or
   wherein the first thermoplastic resin and the second thermoplastic resin are both polyesters and contain ethylene-2,6-naphthalene dicarboxylate in an amount of 80 mol % or more based on the total of all the recurring units of all the polyesters.

2. The image display screen of claim 1, wherein the wavelength showing the maximum reflectance of the reflection peak is in the range of 420 to 480 nm, 520 to 580 nm or 590 to 650 nm, and the maximum reflectance is 5 to 70% higher than the base line of reflectance.

3. The image display screen of claim 1, wherein at least either one of the first thermoplastic resin layers and the second thermoplastic resin layers contain inert particles.

4. The image display screen of claim 3, wherein the inert particles are at least one member selected from the group consisting of silica particles, alumina particles, calcium carbonate particles, calcium phosphate particles, kaolin particles, talc particles, silicone particles, crosslinked polystyrene particles and styrene-vinylbenzene copolymer particles.

5. The image display screen of claim 4, wherein the average particle diameter of the inert particles is 0.01 to 5 µm.

6. The image display screen of claim 3, wherein the inert particles are contained in an amount of 0.001 to 5 wt % based on the weight of the multi-layer film.

7. The image display screen of claim 1 which has at least three reflection peaks with maximum reflectance wavelengths of 420 to 480 nm, 520 to 580 nm and 590 to 650 nm and maximum reflectance's 5 to 70% higher than the base line of reflectance.

8. The image display screen of claim 1 which is assembled with a transparent substrate.

9. A multi-layer film, which comprises at least 11 layers and formed by alternately laminating (1) first thermoplastic resin layers having a thickness of 0.05 to 0.3 µm and second thermoplastic resin layers having a thickness of 0.05 to 0.3 him, has (2) a reflection peak with a maximum reflectance 5 to 80% higher than the base line of reflectance and a half-value width of 20 to 200 nm in its reflectance curve for visible light having a wavelength of 380 to 780 rim and (3) a parallel-ray transmittance of 50% or more, and (4) is for an image display screen, wherein a difference in melting point measured by DSC between the first thermoplastic resin and the second thermoplastic resin before the multi-layer film is formed therefrom is at least 15° C., and wherein the first thermoplastic resin and the second thermoplastic resin are both polyesters and contain ethylene terephthalate in an amount of 80 mol % or more based on the total of all the recurring units of all the polyesters, or wherein the first thermoplastic resin and the second thermoplastic resin are both polyesters and contain ethylene-2,6-naphthalene dicarboxylate in an amount of 80 mol % or more based on the total of all the recurring units of all the polyesters.

10. An image display screen comprising the multi-layer film of claim 9.

* * * * *